(12) United States Patent
Jeon et al.

(10) Patent No.: US 11,726,870 B2
(45) Date of Patent: Aug. 15, 2023

(54) PERIPHERAL COMPONENT INTERCONNECT EXPRESS INTERFACE DEVICE AND SYSTEM INCLUDING THE SAME

(71) Applicant: SK hynix Inc., Gyeonggi-do (KR)

(72) Inventors: Yong Tae Jeon, Gyeonggi-do (KR); Gil Bong Park, Gyeonggi-do (KR); Dong Jin Seong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/380,593

(22) Filed: Jul. 20, 2021

(65) Prior Publication Data
US 2022/0261311 A1    Aug. 18, 2022

(30) Foreign Application Priority Data
Feb. 18, 2021   (KR) .................. 10-2021-0022109

(51) Int. Cl.
| | | |
|---|---|---|
| *G11C 29/00* | (2006.01) | |
| *G06F 11/10* | (2006.01) | |
| *G06F 11/07* | (2006.01) | |
| *G06F 9/448* | (2018.01) | |
| *G06F 13/40* | (2006.01) | |
| *G06F 13/42* | (2006.01) | |

(52) U.S. Cl.
CPC ........ *G06F 11/1068* (2013.01); *G06F 9/4498* (2018.02); *G06F 11/0757* (2013.01); *G06F 13/4027* (2013.01); *G06F 13/4221* (2013.01)

(58) Field of Classification Search
CPC ............. G06F 11/1068; G06F 11/0757; G06F 9/4498; G06F 13/4027; G06F 13/4221
See application file for complete search history.

(56) References Cited

U.S. PATENT DOCUMENTS

| | | | |
|---|---|---|---|
| 2010/0042766 A1* | 2/2010 | Lai ..................... | H04L 47/10 710/244 |
| 2020/0304349 A1* | 9/2020 | Sato ................. | H04L 25/03019 |
| 2020/0364129 A1* | 11/2020 | Das Sharma ....... | G06F 11/3027 |
| 2021/0013999 A1 | 1/2021 | Choudhary et al. | |

FOREIGN PATENT DOCUMENTS

| | | |
|---|---|---|
| KR | 10-2005-0098986 A | 10/2005 |
| KR | 10-1874726 B1 | 7/2018 |

OTHER PUBLICATIONS

Office Action for Korean Patent Application No. 10-2021-0022109 issued by the Korean Patent Office dated Jan. 26, 2023.

* cited by examiner

*Primary Examiner* — Samir W Rizk
(74) *Attorney, Agent, or Firm* — IP & T Group LLP

(57) ABSTRACT

Provided herein is a PCIe interface device. The PCIe interface device may include a NOP DLLP generator configured to generate a No Operation (NOP) data link layer packet (DLLP) including event information representing an event in response to the occurrence of the event and a transmitter configured to transmit the NOP DLLP to an external device through a link including a plurality of lanes.

20 Claims, 10 Drawing Sheets

PERIPHERAL COMPONENT INTERCONNECT EXPRESS INTERFACE DEVICE AND SYSTEM INCLUDING THE SAME

CROSS-REFERENCE TO RELATED APPLICATION

The present application claims priority under 35 U.S.C. § 119(a) to Korean patent application number 10-2021-0022109 filed on Feb. 18, 2021, the entire disclosure of which is incorporated by reference herein.

BACKGROUND

Field of Invention

Various embodiments of the present disclosure generally relate to an electronic device, and more particularly to a peripheral component interconnect express (PCIe) interface device and a system including the PCIe interface device.

Description of Related Art

Peripheral Component Interconnect Express (PCIe) is an interface having a serial structure for data communication. A PCIe-based storage device supports a multi-port and a multi-function. The PCIe-based storage device may be virtualized or non-virtualized, and may achieve Quality of Service (QoS) of a host input and output (I/O) command through one or more PCIe functions.

A storage device is a device configured to store data under the control of a host device, such as a computer, a smartphone, or the like. The storage device may include a memory device in which data is stored and a memory controller configured to control the memory device. The memory device is generally classified into a volatile memory device and a nonvolatile memory device.

The volatile memory device is a memory device configured to store data only when power is supplied thereto and to cause the stored data to be erased when a power supply is interrupted. The volatile memory device includes a Static Random Access Memory (SRAM), a Dynamic Random Access Memory (DRAM), and the like.

The nonvolatile memory device is a memory device configured such that data is not erased even though a power supply is interrupted, and includes a Read Only Memory (ROM), a Programmable ROM (PROM), an Electrically Programmable ROM (EPROM), an Electrically Erasable and Programmable ROM (EEPROM), a flash memory, and the like.

SUMMARY

Various embodiments of the present disclosure are directed to a PCIe interface device capable of detecting the trigger points of occurring events using a no operation (NOP) data link layer packet (DLLP) and a system including the PCIe interface device.

An embodiment of the present disclosure may provide for a PCIe interface device. The PCIe interface device may include a NOP DLLP generator configured to generate a No Operation (NOP) data link layer packet (DLLP) including event information representing an event in response to the occurrence of the event, and a transmitter configured to transmit the NOP DLLP to an external device through a link including a plurality of lanes.

An embodiment of the present disclosure may provide for a PCIe system. The PCIe system may include a first PCIe device configured to generate a No Operation (NOP) data link layer packet (DLLP) including event information representing an event in response to the occurrence of the event and to transmit the NOP DLLP through a link including a plurality of lanes, and a second PCIe device configured to, when the NOP DLLP is received from the first PCIe device, perform a dump operation for storing information about data and packets transmitted and received during a set time period including the time at which the NOP DLLP is received.

An embodiment of the present disclosure may provide for a PCIe system. The PCIe system may include a first PCIe device configured to generate a No Operation (NOP) data link layer packet (DLLP) including event information representing an event in response to the occurrence of the event and to transmit the NOP DLLP through a link including a plurality of lanes, a second PCIe device coupled to the first PCIe device through the link and configured to transmit and receive a packet including the NOP DLLP to and from the first PCIe device, and a protocol analyzer coupled to the link and configured to monitor the packet transmitted and received between the first PCIe device and the second PCIe device through the link and to perform a dump operation for storing information about a communication environment based on the event information when detecting the NOP DLLP.

DETAILED DESCRIPTION

Specific structural or functional descriptions of the embodiments of the present disclosure introduced in this specification or application are only for description of the embodiments of the present disclosure. The descriptions should not be construed as being limited to the embodiments described in the specification or application.

The present disclosure will now be described in detail based on embodiments. The present disclosure may, however, be embodied in many different forms and should not be construed as being limited to only the embodiments set forth herein, but should be construed as covering modifications, equivalents or alternatives falling within ideas and technical scopes of the present disclosure. However, this is not intended to limit the present disclosure to particular modes of practice, and it is to be appreciated that all changes, equivalents, and substitutes that do not depart from the spirit and technical scope of the present disclosure are encompassed in the present disclosure. Detailed description of functions and structures well known to those skilled in the art will be omitted to avoid obscuring the subject matter of the present disclosure. This aims to omit unnecessary description to make the gist of the present disclosure clear.

Hereinafter, various embodiments of the present disclosure will be described in detail with reference to the accompanying drawings.

Figure 1:
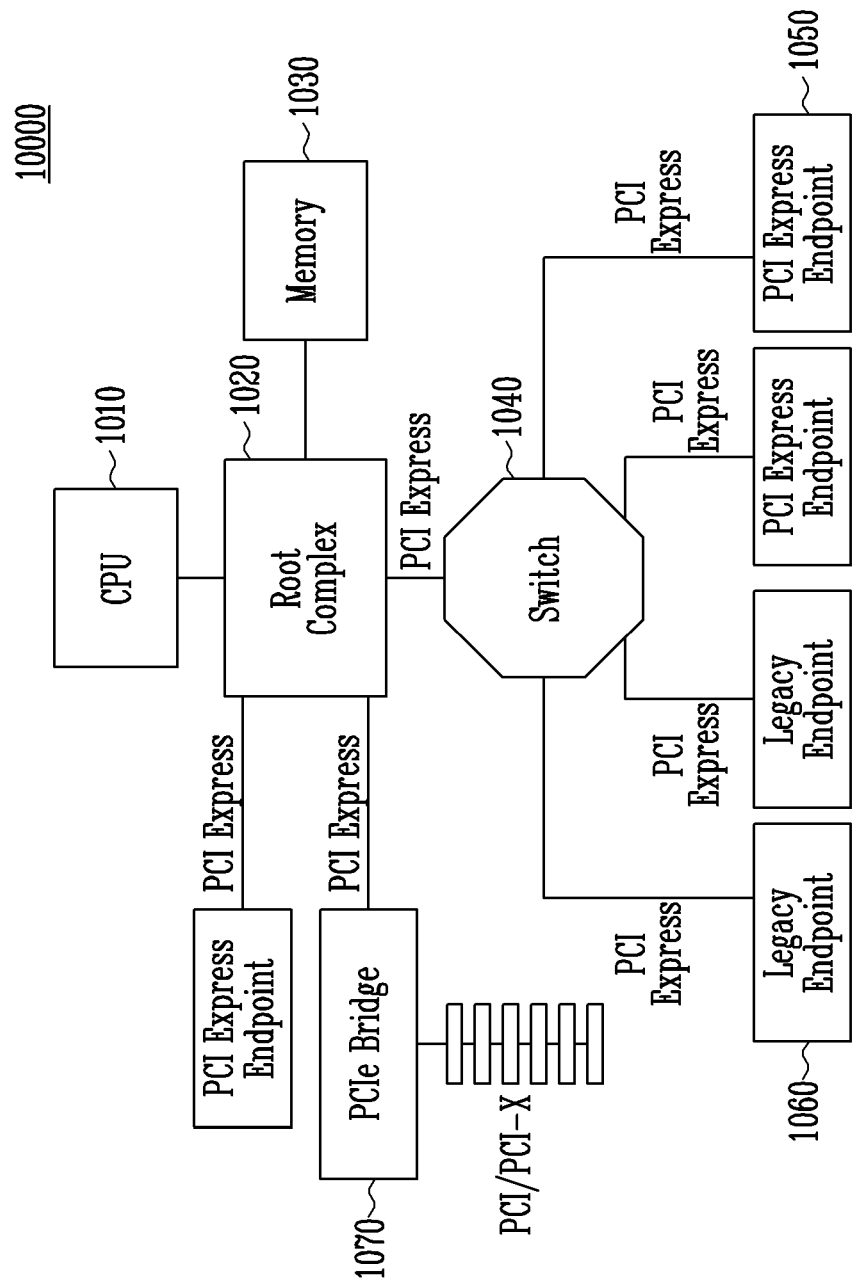
FIG. 1 is a diagram illustrating a PCIe computing system according to an embodiment of the present disclosure.

FIG. 1 is a diagram illustrating a PCIe computing system 10000 according to an embodiment of the present disclosure.

Referring to FIG. 1, the PCIe computing system 10000 may include a central processing unit (CPU) 1010, a root complex 1020, a memory 1030, a switch 1040, a Peripheral Component Interconnect (PCI) Express (PCIe) endpoint 1050, a legacy endpoint 1060, and a PCIe bridge 1070.

The PCIe computing system 10000 may be an electronic device supporting communication using a PCIe interface. The PCIe computing system 10000 may be a PC, a laptop computer, or a mobile computing device, and may include an expansion card, an expansion board, an adapter card, an add-in card, or an accessory card. Also, the PCIe computing system 10000 may include a printed circuit board (PCB) that is insertable into an electrical connector or an expansion slot on the motherboard of the PCIe computing system 10000 in order to provide additional functions to the PCIe computing system 10000 through an expansion bus. Also, the PCIe computing system 10000 may include a storage device such as solid state drives (SSD), and may include a graphics card, a network card, a USB card, or the like.

The central processing unit 1010 is electrically coupled to the respective components of the PCIe computing system 10000, and may control each operation of the PCIe computing system 10000. Specifically, the central processing unit 1010 may control the components of hardware or software coupled to the central processing unit 1010 by running an operating system or applications, and may process various types of data and perform operations. Also, the central processing unit 1010 may execute software or an application for controlling the operation of the PCIe computing system 10000.

The root complex 1020 may be a root hub, a controller hub, or a root controller in the interconnect architecture of Peripheral Component Interconnect (PCI) Express (PCIe). For example, the root complex 1020 may include a chipset, a memory controller hub (MCH), a northbridge, an interconnect controller hub (ICH), a southbridge, and a root controller/hub. Also, the root complex 1020 may couple the central processing unit 1010 and the memory 1030 to an I/O hierarchy. The root complex 1020 may support Peer-to-Peer (P2P) routing. The root complex 1020 may include at least one host bridge and a root port. The root complex 1020 may support one or more Peripheral Component Interconnect Express (PCIe) ports.

The memory 1030 may store data, commands, or program code required for the operation of the PCIe computing system 10000. In an embodiment, the memory 1030 may store program code that is capable of operating to execute one or more operating systems (OS) and virtual machines (VM) and program code executing Virtualization Intermediary (VI) for managing the virtual machines. Also, the memory 1030 may be implemented as a volatile memory device such as a DRAM, an SRAM or the like.

The switch 1040 may route a packet or a message upstream or downstream. Specifically, the switch 1040 may route a packet or a message upstream from the PCIe endpoint 1050 to the root complex 1020, or may route a packet or a message downstream from the root complex 1020 to the PCIe endpoint 1050.

The switch 1040 may be referred to as the logic assembly of a plurality of virtual PCI-to-PCI bridge devices. The devices that can be coupled to the switch 1040 may include any internal or external devices or components coupled to an electronic system, such as an I/O device, a Network Interface Controller (NIC), an add-in card, an audio processor, a network processor, a hard drive, a storage device, a CD/DVD ROM, a monitor, a printer, a mouse, a keyboard, a router, a portable storage device, a firewire device, a Universal Serial Bus (USB) device, a scanner, and other input/output devices.

The PCIe endpoint 1050 and the legacy endpoint 1060 may serve as the requestor or completer of a PCIe transaction. A transaction layer packet (TLP) transmitted and received by the PCIe endpoint 1050 and the legacy endpoint 1060 must provide a configuration space header. Also, the PCIe endpoint 1050 and the legacy endpoint 1060 must provide a configuration request as a completer.

The PCIe endpoint 1050 and the legacy endpoint 1060 may be identified depending on the size of a memory transaction. For example, when a memory transaction exceeding 4 GB is possible, the endpoint may be the PCIe endpoint 1050, and when a memory transaction exceeding 4 GB is impossible, the endpoint may be the legacy endpoint 1060. The PCIe endpoint 1050 is not allowed to generate an I/O request, but the legacy endpoint 1060 may provide or generate an I/O request. Also, the PCIe endpoint 1050 may transmit and receive a TLP to and from the root complex 1020. Also, PCI/PCI-X may transmit and receive a TLP to and from the root complex 1020 via the PCIe bridge 1070. The PCIe endpoint 1050 or the legacy endpoint 1060 may transmit and receive a TLP to and from the switch 1040.

Figure 2:
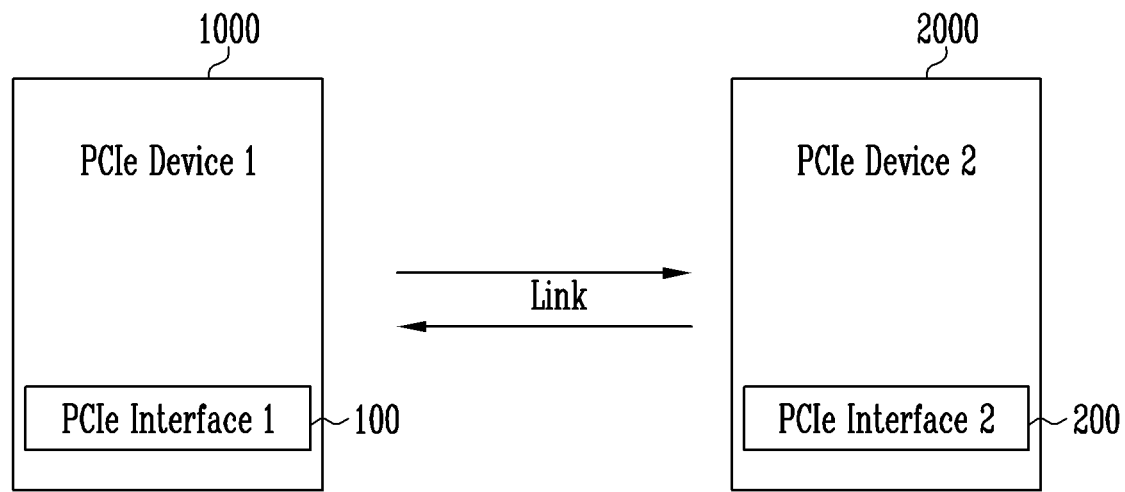
FIG. 2 is a diagram illustrating a connection between PCIe devices according to an embodiment of the present disclosure.

FIG. 2 is a diagram illustrating a connection between a first PCIe device 1000 and a second PCIe device 2000 according to an embodiment of the present disclosure.

Referring to FIG. 2, the PCIe devices 1000 and 2000 may include a PCIe interface 100 and 200, respectively. Each PCIe device may be an electronic device that supports a PCIe protocol using the corresponding PCIe interface. For example, the first PCIe device 1000 or the second PCIe device 2000 may be any of the root complex 1020, the switch 1040, the PCIe endpoint 1050, the legacy endpoint 1060, and the PCIe bridge 1070 of FIG. 1.

The first PCIe device 1000 may communicate with the second PCIe device 2000 using a first PCIe interface 100. The second PCIe device 2000 may communicate with the first PCIe device 1000 using a second PCIe interface 200. Specifically, the first PCIe device 1000 may convert the data to transmit to the second PCIe device 2000 into a protocol suitable for communication using the first PCIe interface 100. The second PCIe device 2000 may convert the data to transmit to the first PCIe device 1000 into a protocol suitable for communication using the second PCIe interface 200. For example, the first PCIe device 1000 may convert the data to transmit to the second PCIe device 2000 into a PCIe protocol using the first PCIe interface 100. The first PCIe device 1000 and the second PCIe device 2000 may establish a link, and the first PCIe device 1000 and the second PCIe device 2000 may communicate through the established link. For example, the first PCIe device 1000 or the second PCIe device 2000 may transmit and receive a packet according to the PCIe protocol through the link.

Figure 3:
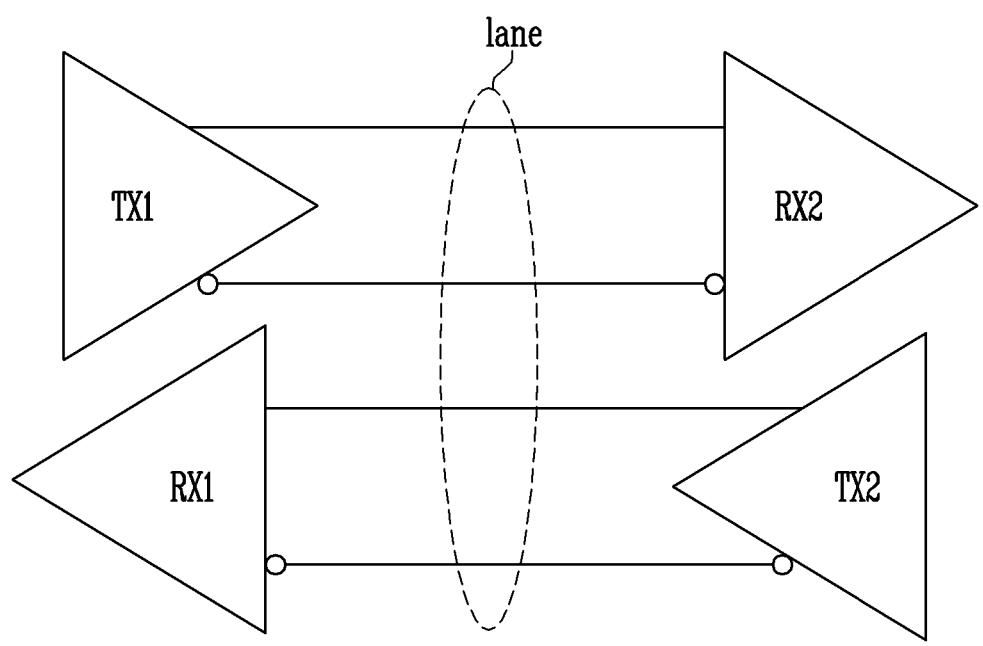
FIG. 3 is a diagram illustrating a lane according to an embodiment of the present disclosure.

FIG. 3 is a diagram illustrating a lane according to an embodiment of the present disclosure.

Referring to FIG. 3, a first transmitter TX1, a second transmitter TX2, a first receiver RX1, and a second receiver RX2 are illustrated. The lane may include paths including differentially driven signal pairs, e.g., a transmission path pair configured for transmission and a reception path pair configured for reception. A PCIe device may include transmission logic for transmitting data to another PCIe device and reception logic for receiving data from another PCIe device. For example, the PCIe device may include two transmission paths coupled to the first transmitter TX1 and two reception paths coupled to the first receiver RX1.

Here, the transmission path may mean any path for transmitting data, such as a transmission line, a copper line, an optical line, a wireless communication channel, an infrared communication link, or any other communication paths. The reception path is implemented in the same way as the transmission path, but may be a path used for reception.

The connection between two devices, e.g., between the first PCIe device 1000 and the second PCIe device 2000, may be referred to as a link. The link may support one or more lanes. Each of the lanes may represent a set of differential signal pairs (one pair for transmission and the other pair for reception). The link may include a plurality of lanes in order to adjust the bandwidth. For example, the link may include 1, 2, 4, 8, 12, 16, 32 or 64 lanes.

Figure 4:
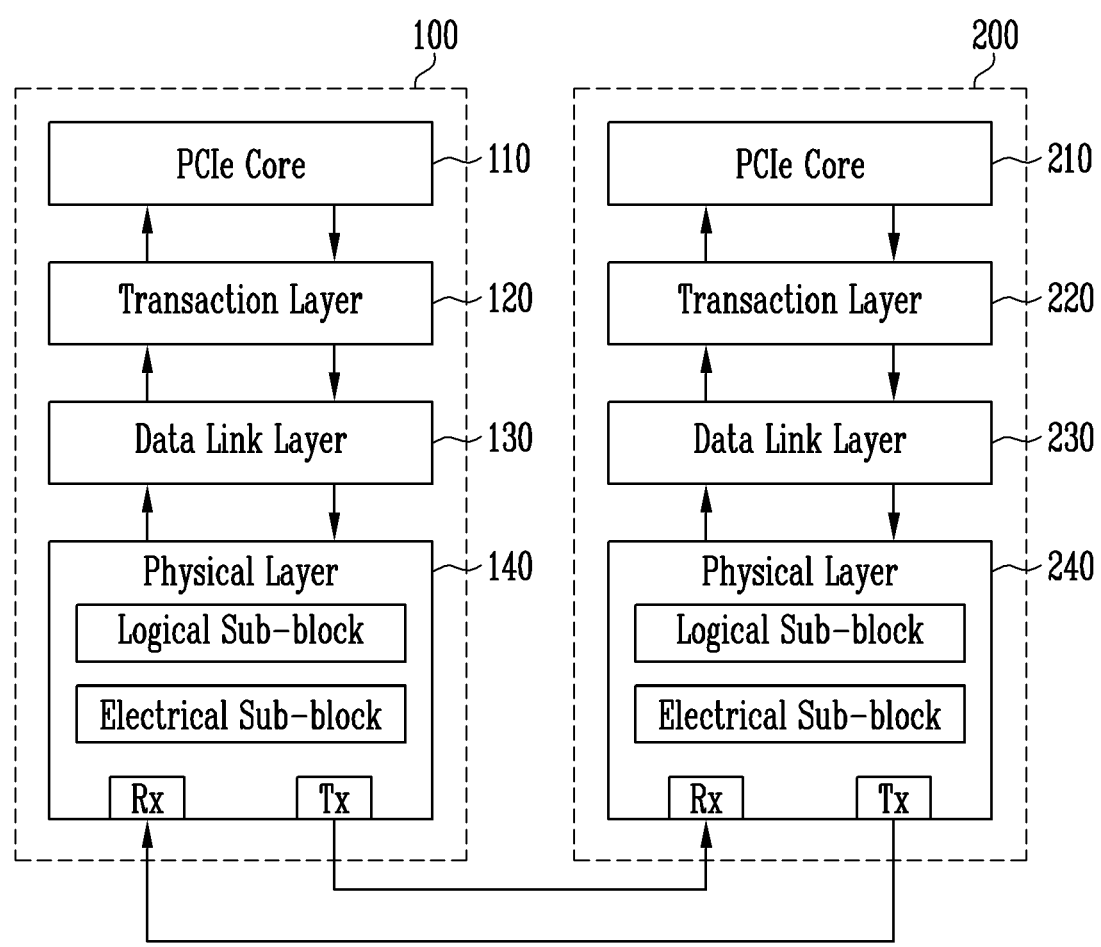
FIG. 4 is a diagram illustrating a PCIe interface according to an embodiment of the present disclosure.

FIG. 4 is a diagram illustrating a PCIe interface according to an embodiment of the present disclosure. Each of the layers included in the PCIe interface may include two sections. One of the sections may be a section for processing the outbound information (or the information to be transmitted), and the other one may be a section for processing the inbound (or received) information. For example, when the first PCIe interface 100 transmits data to the second PCIe interface 200 using the section for processing the outbound information (or the information to be transmitted), the second PCIe interface 200 may process the transmitted data using the section for processing the inbound (or received) information. Also, the PCIe interface may use packets in order to communicate data with another PCIe interface.

Referring to FIG. 4, the first PCIe interface 100 and the second PCIe interface 200 are illustrated. The PCIe layers included in each of the first PCIe interface 100 and the second PCIe interface 200 may include three discrete logical layers. Specifically, the first PCIe interface 100 may include a PCIe core 110, a transaction layer 120, a data link layer 130, and a physical layer 140. The second PCIe interface 200 may include a PCIe core 210, a transaction layer 220, a data link layer 230, and a physical layer 240. That is, the first PCIe interface 100 and the second PCIe interface 200 may be formed with the same structure, and thus a description will be made based on the first PCIe interface 100 hereinbelow.

The PCIe core 110 may generally control the first PCIe interface 100. Specifically, the PCIe core 110 may include a software layer for operating the first PCIe interface 100. Also, the PCIe core 110 may transmit an address, a transaction type, data, and the like to the transaction layer 120, or may receive an address, a transaction type, data, and the like from the transaction layer 120.

In the structure of the PCIe interface, an upper layer may be the transaction layer 120. The transaction layer 120 may assembly or disassembly transaction layer packets (TLPs). Also, the transaction layer 120 may implement a split transaction, that is, a transaction by which, while a target system is collecting data required for a response, traffic other than that can be transmitted through a link. For example, the transaction layer 120 may implement a transaction in which a request and a response are separated by time. In an embodiment, four transaction address spaces may include a configuration address space, a memory address space, an input/output address space, and a message address space. A memory space transaction may include one or more of a read request and a write request for delivering data to/from a memory-mapped place. In an embodiment, the memory space transaction may use two different address formats, e.g., a short address format such as a 32-bit address or a long address format such as a 64-bit address. A configuration space transaction may be used to access the configuration space of the PCIe device. The transaction to the configuration space may include a read request and a write request. A message space transaction (or message) may be defined to support in-band communication between PCIe devices. The transaction layer 120 may store link configuration information and the like received from the PCIe core 110. Also, the transaction layer 120 may generate a TLP requested by the PCIe core 110, or may convert a received TLP into a payload or status information.

In the structure of the PCIe interface, a middle layer is the data link layer 130, and the data link layer 130 may function as the intermediate stage between the transaction layer 120 and the physical layer 140. The main function of the data link layer 130 may be link management and data integrity ensuring, including error detection and error correction. Specifically, the transmission side of the data link layer 130 may accept TLPs assembled by the transaction layer 120, assign a data protection code, or calculate a TLP sequence number. Also, the transmission side of the data link layer 130 may transmit the data protection code and the TLP sequence number to the physical layer 140 for transmission over a link. The reception side of the data link layer 130 may check data integrity of TLPs received from the physical layer 140, and may transmit the TLPs to the transaction layer 120 for additional processing.

The physical layer 140 may include all circuitry for interface operations. Here, all circuitry may include a driver, an input buffer, a series-to-parallel conversion circuit, a parallel-to-series conversion circuit, a phase-locked loop (PLL), and an impedance-matching circuit.

Also, the physical layer 140 may include a logical sub-block and an electrical sub-block for physically transmitting a packet to an external PCIe device. Here, the logical sub-block may act a role that is necessary for a 'digital' function of the physical layer 140. With regard to this, the logical sub-block may include a transmission section for preparing the outgoing information to be transmitted by an electrical sub-block and a reception section for identifying and preparing the received information before delivering the received information to the data link layer 130. The physical layer 140 may include a transmitter TX and a receiver RX. The transmitter TX may be supplied with symbols, which are serialized and transmitted to an external device by the transmitter, from the logical sub-block. Also, the receiver RX may be supplied with serialized symbols from the external device, and may convert the received signal into a bitstream. The bitstream may be deserialized and supplied to the logical sub-block. That is, the physical layer 140 may convert the TLPs received from the data link layer 130 into a serialized format, and may convert the packets received from the external device into a deserialized format. Also, the physical layer 140 may include logical functions related to interface initialization and maintenance.

The structures of the first PCIe interface 100 and the second PCIe interface 200 are illustrated in FIG. 4, but an arbitrary form, such as a quick-path interconnect structure, a next-generation high-performance computing interconnect structure, or any other hierarchized structures, may be included.

Figure 5:
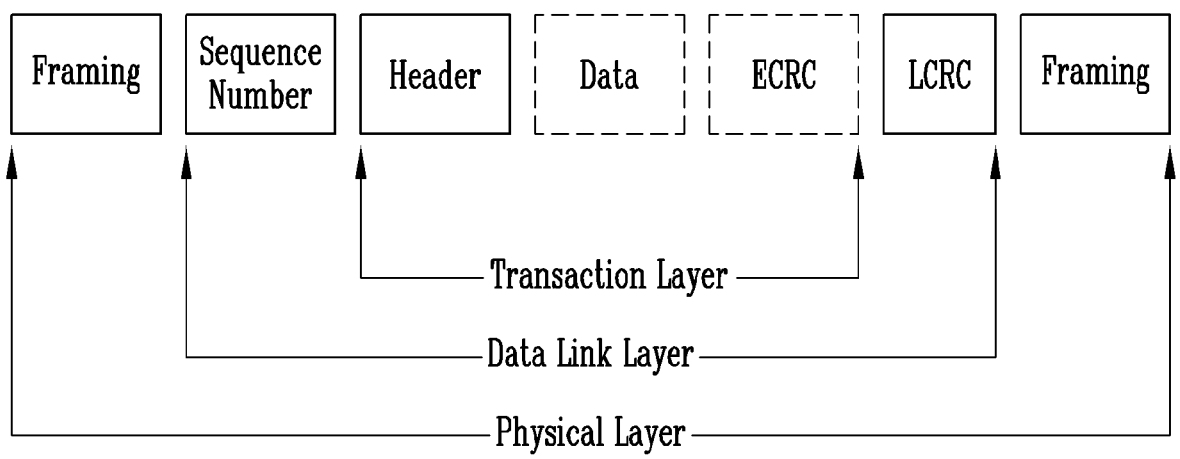
FIG. 5 is a diagram illustrating the configuration of a packet according to an embodiment of the present disclosure.

FIG. 5 is a diagram illustrating the configuration of a packet 50 according to an embodiment of the present disclosure.

Referring to FIG. 5, the respective components of the packet 50 may be sequentially processed at the respective layers of a PCIe interface. Specifically, the packet 50 may configure different protocols as the formats processed at the respective layers. For example, a transaction layer packet (TLP) may be generated and processed at the transaction layer 120 or 220, and the TLP may include a header field, a data field, and an ECRC field. Here, the header field may be a field including the type of the TLP, information about whether data is included and whether a CRC is included, and the like. Also, the data field may be a field including the data to be transmitted or received, and the ECRC field may be a field including an end-to-end cyclic redundancy check (ECRC) value indicating information about an endpoint. Moreover, the data field and the ECRC field may not be included in the TLP.

Also, a data link layer packet (DLLP) may be generated and processed at the data link layer 130 or 230. The DLLP may further include a sequence number field and an LCRC field in addition to the TLP. Here, the sequence number field may be a field including information about the sequence number of the TLP, and the LCRC field may be a field including information about a link cyclic redundancy check (LCRC).

Also, a physical layer packet (PLP) may be generated and processed at the physical layer 140 or 240. The PLP may further include a framing field in addition to the DLLP. Here, the framing field may be a field including information about a serialized format.

Figure 6:
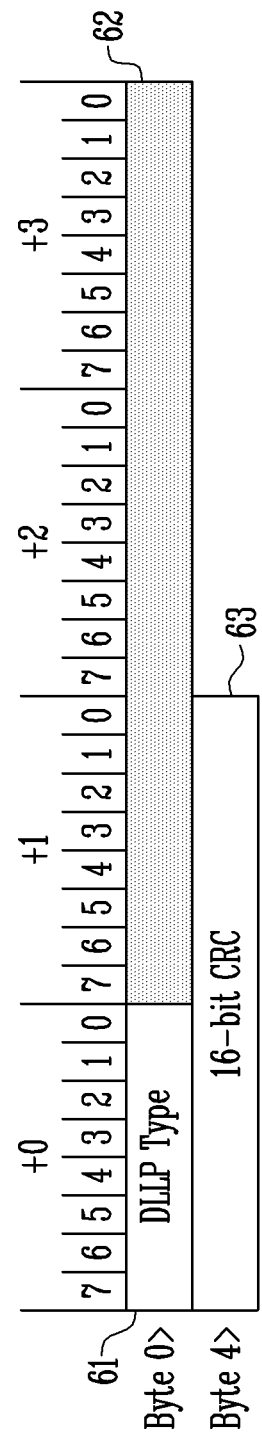
FIG. 6 is a diagram illustrating a DLLP according to an embodiment of the present disclosure.

FIG. 6 is a diagram illustrating a DLLP according to an embodiment of the present disclosure.

Referring to FIG. 6, the fields that a data link layer packet (DLLP) must include according to a PCIe rule are illustrated. Specifically, a DLLP may include a type field 61, a support field 62, and a cyclic redundancy check (CRC) field 63.

The type field 61 may be a field indicating the type of the DLLP. Here, the type of the DLLP may include various functions such as an acknowledge (Ack) function for delivering an acknowledgement response from the reception side to the transmission side, a negative acknowledge (Nak) function for delivering a negative acknowledgement response, a power management function, and the like. Also, the various functions of the DLLP may be identified using the value encoded in the type field 61.

TABLE 1

| Encodings(b) | DLLP Type |
| --- | --- |
| 0000 0000 | Ack |
| 0000 0001 | MRInit |
| 0000 0010 | Data_Link_Feature |

TABLE 1-continued

| Encodings(b) | DLLP Type |
| --- | --- |
| 0001 0000 | Nak |
| 0010 0000 | PM_Enter_L1 |
| 0010 0001 | PM_Enter_L1 |
| 0010 0011 | PM_Active_State_Request_L1 |
| 0010 0100 | PM_Request_Ack |
| 0011 0000 | Vendor-specific |
| 0011 0001 | NOP |
| 0100 $0_{r2r1r0}$ | InitFC1-P |
| 0101 $0_{r2r1r0}$ | InitFC1-NP |
| 0110 $0_{r2r1r0}$ | InitFC1-cpl | according to the PCIe rule. However, Table 1 illustrates only a part of the DLLP types, and the encoded values can be changed according to a future PCIe rule. The support field 62 may include different data depending on the DLLP type. That is, the support field 62 may include data corresponding to the type field 61. For example, when the type field 61 is the type corresponding to Ack or Nak, the support field 62 may include information about the sequence number corresponding to the Ack or Nak.

The CRC field 63 may be a field that must be included in the DLLP. Also, the CRC field 63 may be a field for ensuring (or checking) the data integrity of the DLLP. Specifically, the receiver of the DLLP may compare the CRC value of the DLLP calculated using a preset method with the CRC field 63, and may ensure the data integrity depending on whether the CRC field 63 includes the same value as the calculated CRC value. That is, the CRC field 63 may be calculated based on the preset method, and the data integrity of the DLLP may be ensured using the result of calculation of the CRC field 63.

Figure 7:
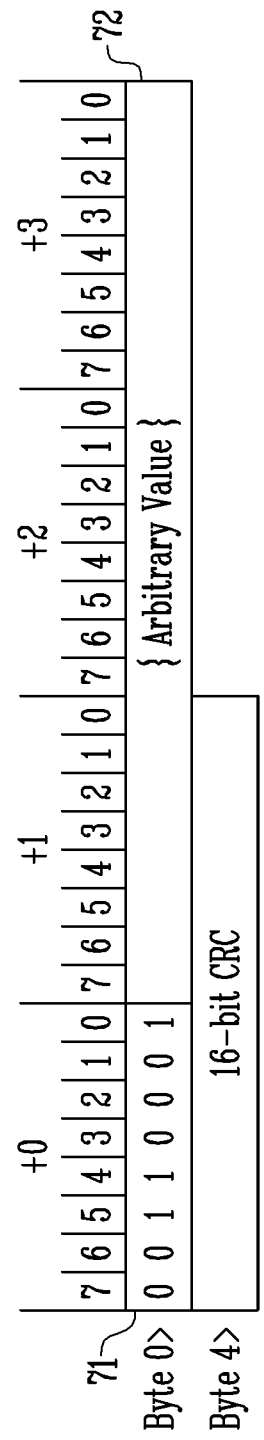
FIG. 7 is a diagram illustrating the structure of a NOP DLLP according to an embodiment of the present disclosure.

FIG. 7 is a diagram illustrating the structure of a No Operation (NOP) DLLP according to an embodiment of the present disclosure.

Referring to FIG. 7, the format of a NOP DLLP is illustrated. Specifically, a NOP DLLP may include a type field 71 indicating the type of the DLLP, a support field 72 according to the NOP DLLP, and a CRC field. As described with reference to FIG. 7, the type field 71 may include "00110001" that is the value encoded to indicate the NOP DLLP, among the various functions of the DLLP. The support field 72 may include an arbitrary value. A conventional NOP DLLP is discarded without any special action after data integrity is checked, and the arbitrary value included in the support field 72 is used only for the purpose of calculating a CRC. Furthermore, when a compatibility issue occurs in any of PCIe devices communicating with each other, it may be necessary to specify the exact time at which the issue has occurred for accurate debugging.

According to an embodiment of the present disclosure, a PCIe device may announce whether an event occurs with information about the event to another PCIe device on the reception side using a NOP DLLP. Also, the PCIe device dumps the packet and data at the time of transmitting and receiving the NOP DLLP, thereby handling the occurring event. Here, 'dump' may mean storing or outputting the content of a specific device in or to another device in order to correct a program error or to check data.

Figure 8:
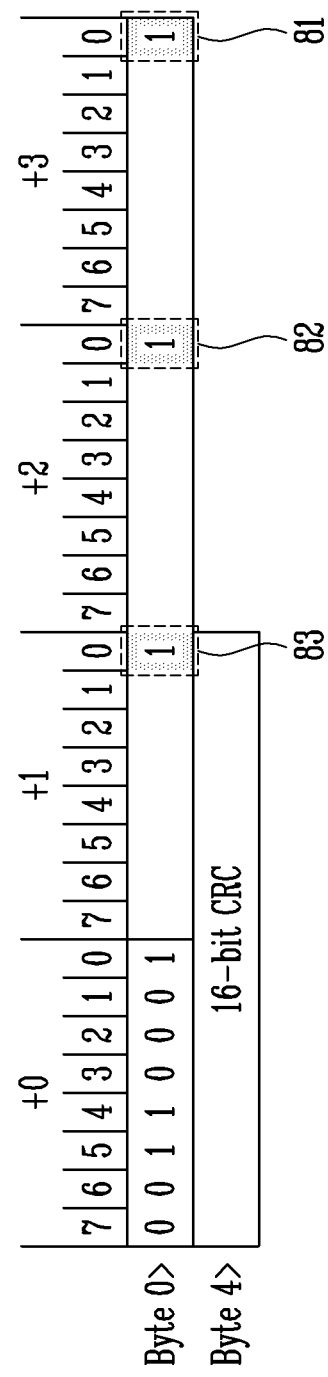
FIG. 8 is a diagram illustrating event information according to an embodiment of the present disclosure.

FIG. 8 is a diagram illustrating event information according to an embodiment of the present disclosure.

Referring to FIG. 8, a NOP DLLP including event information that represents an event is illustrated. According to an embodiment of the present disclosure, a PCIe device may notify an additional PCIe device of an event occurring during communication with the additional PCIe device. Specifically, some of the bits of the support field (e.g., 72 of FIG. 7) of a NOP DLLP may be assigned for the information about the event. Also, when an event occurs during communication with the additional PCIe device, the PCIe device may transmit a NOP DLLP including information about the event to the additional PCIe device. For example, the support field of the NOP DLLP may be configured with 24 bits, and each of the bits of the support field of the NOP DLLP may correspond to each possible event. Also, the PCIe device sets any bit of the support field of the NOP DLLP, thereby notifying the additional PCIe device or a protocol analyzer of the occurrence of a specific event. The additional PCIe device and the protocol analyzer may detect that the time of receiving the NOP DLLP transmitted from the PCIe device is the time at which the specific event has occurred, and the additional PCIe device and the protocol analyzer may use the corresponding time as the trigger point at which to dump packets and data. That is, upon receiving the NOP DLLP from the PCIe device, the additional PCIe device and the protocol analyzer may dump the packets and data that are communicated.

According to an embodiment of the present disclosure, the support field of a NOP DLLP may represent event information. For example, the first bit 81 of the support field of the NOP DLLP may be a bit indicating that an unexpected decrease in the data transmission speed is caused due to the timeout of a link training & status state machine (LTSSM). When a decrease in the speed is caused due to the timeout of the LTSSM, the PCIe device may transmit a NOP DLLP, in which the first bit 81 is set, to the additional PCIe device and the protocol analyzer. Accordingly, the additional PCIe device and the protocol analyzer may detect that a decrease in the speed is caused due to the timeout of the LTSSM included in the PCIe device by referring to the event information in the received NOP DLLP.

According to an embodiment of the present disclosure, the support field of the NOP DLLP may include information about a plurality of events. Specifically, the event information may include information such as the reduction of lanes due to the timeout of an LTSSM, the occurrence of linkdown due to the timeout of the LTSSM, the occurrence of an internal parity error, the completion of post-processing of a parity error, the performance of a temperature rise prevention operation caused due to a temperature rise, the termination of the temperature rise prevention operation, and the like. Also, the PCIe device transmits a NOP DLLP in which the second bit 82, corresponding to 'the occurrence of an internal parity error', and the third bit 83, corresponding to 'the performance of a temperature rise prevention operation caused due to a temperature rise', are set, thereby transmitting event information corresponding to the plurality of events to the additional PCIe device and the protocol analyzer.

Figure 9:
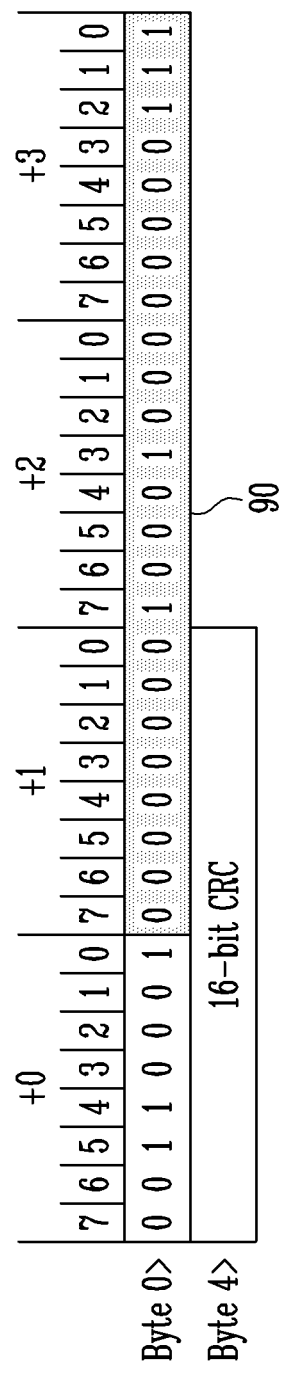
FIG. 9 is a diagram illustrating event information according to an embodiment of the present disclosure.

FIG. 9 is a diagram illustrating event information according to an embodiment of the present disclosure.

Referring to FIG. 9, the support field of a NOP DLLP, in which a plurality of bits are set, is illustrated. A method of mapping each of the bits included in the support field of a NOP DLLP to a single event is described in FIG. 8, but according to an embodiment of the present disclosure, a PCIe device may represent information about a single event using a NOP DLLP including event information. Specifically, the PCIe device may represent information corresponding to $2^{24}$ bits using a method of setting a plurality of bits in the support field of a NOP DLLP. For example, the PCIe device may indicate that a specific event occurs by setting the support field of a NOP DLLP to "000000001000100000000111".

Figure 10:
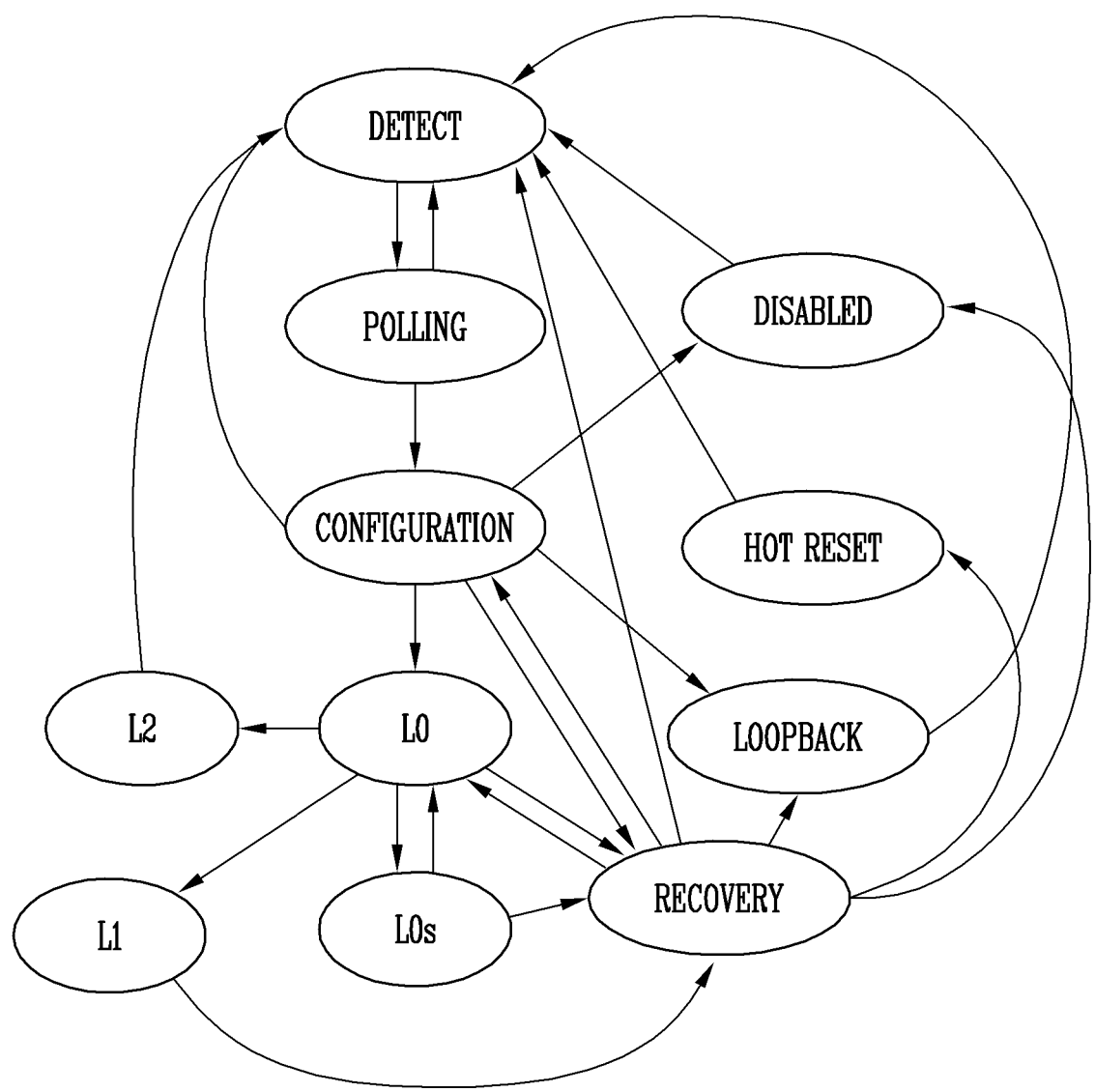
FIG. 10 is a diagram illustrating a link state of a PCIe device according to an embodiment of the present disclosure.

FIG. 10 is a diagram illustrating a link state of a PCIe device according to an embodiment of the present disclosure.

Referring to FIG. 10, the link states of a PCIe device may include states such as a detect state, a polling state, a configuration state, a hot reset state, a disabled state, an L0 state, and the like.

The detect state is an initial state after power-on or reset, and may be entered from the states to be described below. For example, the detect state may be the state entered from the configuration state, the hot reset state, the disabled state, the L2 state, the loopback state, or the recovery state. In the detect state, all of logic, ports, and registers may be reset, and the detect state may be the state in which the operation of detecting a link coupled to a PCIe interface is performed. That is, in the detect state, the operation of searching for a physically coupled lane is performed.

The polling state may indicate the state in which a lane through which data communication is possible, among the detected lanes, is identified. The polling state may be the state in which the operations of synchronizing the clocks of the opposite ends of the PCIe interface, checking whether the polarity of the lane is D+ or D−, and checking the data transmission speed that the lane is able to use are performed. That is, the polling state may be the state in which polarity inversion is checked. Also, the link in the polling state may enter the detect state and the configuration state.

The configuration state may be the state in which the connection state of the lane is checked. Specifically, the configuration state may be the state in which the lane width with which data communication is possible is determined. Also, the configuration state may be the state in which the operation of checking lane reverse is performed. The configuration state may be entered from the poling state, or may be entered when lanes are reduced (lane reduce) or the lane width is increased (lane width up) after entry into the L0 state.

The recovery state may be the state used to reconfigure the link bandwidth. In the recovery state, the set link bandwidth of the link may be changed, and bit lock, symbol lock, and lane-to-lane de-skew may be reconfigured. The recovery state may be entered when an error occurs in the L0 state, and when the error is recovered in the recovery state, transition into the L0 state may be performed. Also, according to an embodiment of the present disclosure, a link equalization operation may be performed in the recovery state.

The L0 state may be a normal operation state in which data and packets can be transmitted and received through a link. Specifically, the L0 state may be the state in which a physical bus interface operates to enable data and control packet to be transmitted and received.

The L0s state is a power saving state that allows the physical bus interface to quickly enter a power conservation state and to recover therefrom without going through the recovery state.

The L1 state may be a power saving state. Power may be actively saved in the L2 state. Most of the transmitter and receiver may be shut off. Main power and clocks are not ensured, but auxiliary power is available.

The loopback state may be the state for using test and fault isolation. Loopback is operated on a lane basis, and a loopback reception lane has to be selected and configured.

The disabled state may be a state in which the configured link is disabled until directed. The hot reset state may be triggered only by a downstream port. The downstream port may use training sequences (e.g., TS1 or TS2) in order to propagate hot reset. Here, the training sequences (TS) may be ordered sets used for initializing bit alignment, symbol alignment, and exchange of physical layer parameters.

Figure 11:
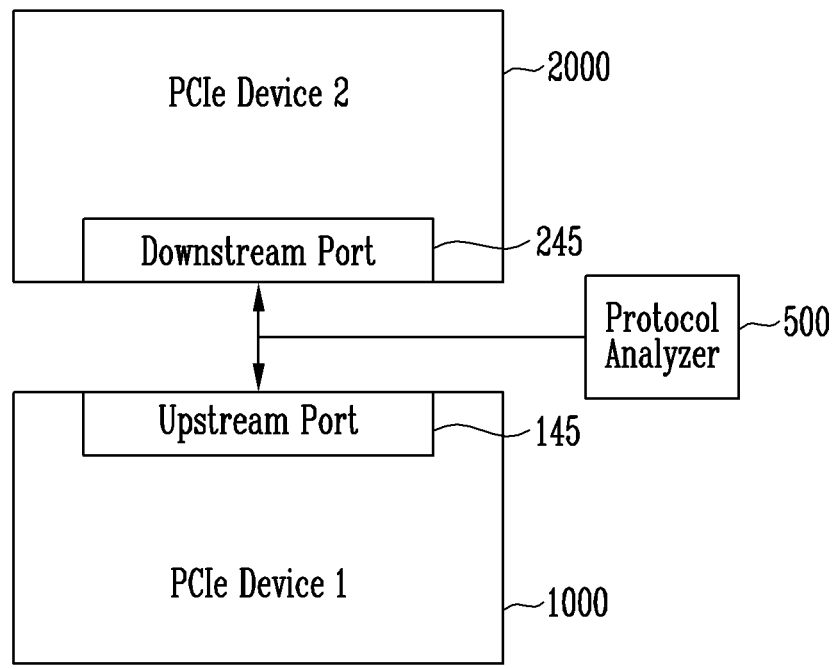
FIG. 11 is a diagram illustrating a protocol analyzer according to an embodiment of the present disclosure.

FIG. 11 is a diagram illustrating a protocol analyzer 500, which is coupled to PCIe devices, according to an embodiment of the present disclosure.

Referring to FIG. 11, a first PCIe device 1000, a second PCIe device 2000, and the protocol analyzer 500 are illustrated.

The first PCIe device 1000 and the second PCIe device 2000 may transmit and receive data or packets through a link. Here, the link may include a plurality of lanes. The first PCIe device 1000 may include an upstream port 145, and the second PCIe device 2000 may include a downstream port 245. The first PCIe device 1000 and the second PCIe device 2000 may support upstream routing and downstream routing using the upstream port 145 and the downstream port 245, respectively.

The protocol analyzer 500 may be coupled to the link to monitor communication between the first PCIe device 1000 and the second PCIe device 2000. Also, the protocol analyzer 500 may dump the upstream routing or downstream routing of the first PCIe device 1000 and the second PCIe device 2000 at a specific time. Here, 'dump' may indicate storing or outputting not only data that is being transmitted but also information about a communication environment in or to the protocol analyzer 500 in order to correct a program error or to check data. Specifically, when it detects transmission of a NOP DLLP from the first PCIe device 1000 or the second PCIe device 2000, the protocol analyzer 500 may dump the data or packets transmitted during a fixed time period including the time at which the detected NOP DLLP is transmitted. The protocol analyzer 500 may dump data or packets transmitted not only from the PCIe device in which the event occurs but also from a PCIe device in which no event occurs.

In an embodiment, when an event occurs in the first PCIe device 1000, the first PCIe device 1000 may transmit a NOP DLLP including information about the event to the second PCIe device 2000. Also, the first PCIe device 1000 may dump the state of the first PCIe device 1000 during a fixed time period including the specific time at which the event has occurred. Then, when the protocol analyzer 500 or the second PCIe device 2000 detects the NOP DLLP transmitted from the first PCIe device 1000, it may dump data or packets that are transmitted during a fixed time period including the time at which the detected NOP DLLP is transmitted. The first PCIe device 1000, the second PCIe device 2000, and the protocol analyzer 500 may store the transmitted data and packets by regarding the specific time at which the event has occurred as a trigger point. Then, the first PCIe device 1000, the second PCIe device 2000, and the protocol analyzer 500 may perform accurate debugging related to the event by synchronizing the specific time at which the event has occurred.

Figure 12:
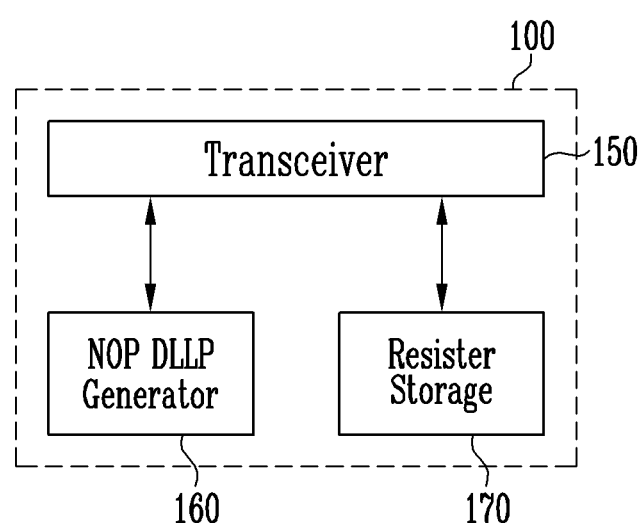
FIG. 12 is a diagram illustrating a first PCIe interface according to an embodiment of the present disclosure.

FIG. 12 is a diagram illustrating a first PCIe interface 100 according to an embodiment of the present disclosure.

Referring to FIG. 12, the first PCIe interface 100 may include a transceiver 150, a NOP DLLP generator 160, and a register storage 170.

The transceiver 150 may be the component for transmitting and receiving packets to and from an additional PCIe device. The transceiver 150 may be coupled to the additional PCIe device through a link including a plurality of lanes. Also, the transceiver 150 may transmit and receive packets to and from the additional PCIe device using the link. According to an embodiment of the present disclosure, the transceiver 150 may transmit a NOP DLLP to the additional PCIe device through the link. According to an embodiment, the transceiver 150 may repeatedly transmit the NOP DLLP during a preset time period. Specifically, in order to prevent the case where the additional PCIe device configured to receive the NOP DLLP cannot receive the transmitted NOP DLLP, the transceiver 150 may repeatedly transmit the NOP DLLP during the preset time period.

The NOP DLLP generator 160 may be the component configured to generate a NOP DLLP. Specifically, when an event occurs in the PCIe device, the NOP DLLP generator 160 may generate a NOP DLLP including event information corresponding to the occurring event. Here, the event information may be information indicating the occurrence of the event. In some embodiments, the event may include at least one of reduction of lanes due to the timeout of an LTSSM, the occurrence of link-down due to the timeout of the LTSSM, the occurrence of an internal parity error, the completion of post-processing of a parity error, the performance of a temperature rise prevention operation caused due to a temperature rise, and the termination of the temperature rise prevention operation caused due to the temperature rise. In an embodiment, the NOP DLLP generator 160 may represent the event information by setting at least one bit of the support field of the NOP DLLP. Also, the NOP DLLP generator 160 may alternatively generate a NOP DLLP in which the bits included in the support field of the NOP DLLP respectively correspond to a plurality of events. The NOP DLLP generator 160 may alternatively generate a NOP DLLP corresponding to a single event using all of the bits included in the support field of the NOP DLLP.

In response to the occurrence of the event, the register storage 170 may store data transmitted and received during a preset time period including the occurrence time of the event and information about the communication environment. The register storage 170 may store not only data transmitted from the PCIe device to the additional PCIe device but also information about the received data. Also, the information stored in the register storage 170 is compared with information stored in the additional PCIe device or a protocol analyzer, whereby an accurate debugging operation for the occurring event may be performed.

The present disclosure provides a PCIe interface device capable of detecting the trigger points of occurring events using a NOP DLLP and a system including the PCIe interface device.

Various embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. The embodiments may be combined to form additional embodiments.

What is claimed is:

1. A peripheral component interconnect express (PCIe) interface device, comprising:
 a No Operation (NOP) data link layer packet (DLLP) generator configured to generate a NOP DLLP including event information representing a trigger point of a dump operation, event in response to occurrence of an event; and a transmitter configured to transmit the NOP DLLP to an external device through a link including a plurality of lanes, wherein the event information is used to specify an occurrence time of the event.

2. The PCIe interface device according to claim 1, wherein the NOP DLLP is discarded in response to a data integrity check, and wherein the NOP DLLP includes a support field including a plurality of bits and the NOP DLLP generator represents the event information by setting at least one bit of the support field of the NOP DLLP.

3. The PCIe interface device according to claim 2, wherein the NOP DLLP generator generates the NOP DLLP in which the bits in the support field of the NOP DLLP respectively correspond to a plurality of events.

4. The PCIe interface device according to claim 2, wherein the NOP DLLP generator generates the NOP DLLP corresponding to a single event using all of the bits in the support field of the NOP DLLP.

5. The PCIe interface device according to claim 1, wherein the transmitter repeatedly transmits the NOP DLLP during a preset time period.

6. The PCIe interface device according to claim 1, further comprising:

a register storage configured to store data, transmitted and received during a preset time period including the occurrence time of the event, and information about a communication environment in response to the occurrence of the event.

7. The PCIe interface device according to claim 1, wherein the event includes at least one of reduction of lanes due to a timeout of a link training and status state machine (LTSSM), occurrence of link-down due to the timeout of the LTSSM, occurrence of an internal parity error, completion of post-processing of a parity error, performance of a temperature rise prevention operation caused due to a temperature rise, and termination of the temperature rise prevention operation caused due to the temperature rise.

8. A peripheral component interconnect express (PCIe) system, comprising:

a first PCIe device configured to generate a No Operation (NOP) data link layer packet (DLLP) including event information representing a trigger point of a dump operation, in response to occurrence of an event, and to transmit the NOP DLLP through a link including a plurality of lanes; and a second PCIe device configured to, when the NOP DLLP is received from the first PCIe device, perform the dump operation for storing information about data and packets transmitted and received during a set time period including a time at which the NOP DLLP is received, wherein the event information is used to specify an occurrence time of the event.

9. The PCIe system according to claim 8, wherein the NOP DLLP is discarded in response to a data integrity check, and wherein the NOP DLLP includes a support field including a plurality of bits and the first PCIe device represents the event information by setting at least one bit of the support field of the NOP DLLP.

10. The PCIe system according to claim 9, wherein the first PCIe device generates the NOP DLLP in which the bits in the support field of the NOP DLLP respectively correspond to a plurality of events.

11. The PCIe system according to claim 9, wherein the first PCIe device generates the NOP DLLP corresponding to a single event using all of the bits in the support field of the NOP DLLP.

12. The PCIe system according to claim 8, wherein the first PCIe device repeatedly transmits the NOP DLLP during a preset time period.

13. The PCIe system according to claim 8, wherein the first PCIe device stores data, transmitted and received during a preset time period including the occurrence time of the event, and information about a communication environment in response to the occurrence of the event.

14. The PCIe system according to claim 8, wherein the event includes at least one of reduction of lanes due to a timeout of a link training and status state machine (LTSSM), occurrence of link-down due to the timeout of the LTSSM, occurrence of an internal parity error, completion of post-processing of a parity error, performance of a temperature rise prevention operation caused due to a temperature rise, and termination of the temperature rise prevention operation caused due to the temperature rise.

15. A peripheral component interconnect express (PCIe) system, comprising:

a first PCIe device configured to generate a No Operation (NOP) data link layer packet (DLLP) including event information representing a trigger point of a dump operation, in response to occurrence of an event, and to transmit the NOP DLLP through a link including a plurality of lanes;

a second PCIe device coupled to the first PCIe device through the link and configured to transmit and receive a packet including the NOP DLLP to and from the first PCIe device; and a protocol analyzer coupled to the link and configured to monitor the packet transmitted and received between the first PCIe device and the second PCIe device through the link and to perform the dump operation for storing information about a communication environment based on the event information when detecting the NOP DLLP, wherein the event information is used to specify an occurrence time of the event.

16. The PCIe system according to claim 15, wherein the NOP DLLP is discarded in response to a data integrity check, and wherein the NOP DLLP includes a support field including a plurality of bits and the first PCIe device represents the event information by setting at least one bit of the support field of the NOP DLLP.

17. The PCIe system according to claim 16, wherein the first PCIe device generates the NOP DLLP in which the bits in the support field of the NOP DLLP respectively correspond to a plurality of events.

18. The PCIe system according to claim 16, wherein the first PCIe device generates the NOP DLLP corresponding to a single event using all of the bits in the support field of the NOP DLLP.

19. The PCIe system according to claim 15, wherein the first PCIe device stores data, transmitted and received during a preset time period including the occurrence time of the event, and information about a communication environment in response to the occurrence of the event.

20. The PCIe system according to claim 15, wherein the event includes at least one of reduction of lanes due to a timeout of a link training and status state machine (LTSSM), occurrence of link-down due to the timeout of the LTSSM, occurrence of an internal parity error, completion of post-processing of a parity error, performance of a temperature rise prevention operation caused due to a temperature rise, and termination of the temperature rise prevention operation caused due to the temperature rise.

\* \* \* \* \*